(12) United States Patent
Birkestrand

(10) Patent No.: US 6,355,996 B1
(45) Date of Patent: Mar. 12, 2002

(54) MODULAR MOTORIZED ELECTRIC WHEEL HUB ASSEMBLY FOR BICYCLES AND THE LIKE

(75) Inventor: Orville J. Birkestrand, Davenport, IA (US)

(73) Assignee: Rabbit Tool U.S.A., Inc., Rock Island, IL (US)

(*) Notice: Subject to any disclaimer, the term of this patent is extended or adjusted under 35 U.S.C. 154(b) by 0 days.

(21) Appl. No.: 09/575,508

(22) Filed: May 22, 2000

Related U.S. Application Data

(63) Continuation-in-part of application No. 09/076,317, filed on May 11, 1998, now Pat. No. 6,100,615.

(51) Int. Cl.[7] .............................. H02K 7/10; H02K 7/00; H02K 9/00; H02K 9/08; B60K 1/00

(52) U.S. Cl. .................. 310/54; 310/57; 310/67 A; 310/75 C; 180/65.5; 180/65.6

(58) Field of Search .................. 310/54, 57, 67 A, 310/75 C, 75 D, 83, 99, 67 R; 180/65.5, 65.6, 65.2

(56) References Cited

U.S. PATENT DOCUMENTS

| | | | |
|---|---|---|---|
| 552,271 A | 12/1895 | Bolton, Jr. | 180/220 |
| 3,567,975 A | 3/1971 | Biesack et al. | 310/54 |
| 3,812,928 A * | 5/1974 | Rockwell et al. | 180/65 F |
| 4,217,529 A * | 8/1980 | Bourke et al. | 318/351 |
| 4,274,023 A | 6/1981 | Lamprey | 310/83 |
| 4,346,777 A | 8/1982 | Restelli | 180/220 |
| 5,014,800 A | 5/1991 | Kawamoto et al. | 180/65.5 |
| 5,034,638 A * | 7/1991 | McCabria | 310/54 |
| 5,087,229 A | 2/1992 | Hewko et al. | 475/149 |

(List continued on next page.)

FOREIGN PATENT DOCUMENTS

| | | |
|---|---|---|
| DE | 196 21 440 | 12/1997 |
| GB | 2 312 403 | 10/1997 |

OTHER PUBLICATIONS

Rockland, Servo Wheels, Compact Wheel Drives for Electric Vehicles, Copyright 1997, pp. 1–7.

Montagewerkstatte der K.u.K., Hof–Wagen and Automobilfabrik J. Lohner & Col., Wien, Faszination Nabenmotor, pre 1997, pp. 80–91.

Assembly Work Shop for K.u.K. Hof–Wagen and automobile manufacture J. Lohner & Co., Vienna, Fasciation Motor Hub, before 1997, pp. 80–91 (English Translation of Previous Article).

Patent Abstracts of Japan, vol. 098, No. 003, Feb. 27, 1998 & JP 09 301262 A (DAIDO Steel CO. LTD; NISSAN MOTOR CO. LTD) Nov. 25, 1997.

*Primary Examiner*—Karl Tamai
*Assistant Examiner*—Dang Dinh Le
(74) *Attorney, Agent, or Firm*—Cesari and McKenna

(57) ABSTRACT

A motorized wheel hub assembly includes a sealed motor section having first and second coaxial shafts extending from the motor section, the second shaft being a rotary shaft and a gear reduction section adjacent to the motor section, the gear reduction section including a pinion at the end of the rotary shaft, a plurality of planet gears rotatably mounted to the housing in meshing engagement with the pinion and a third shaft connected to the motor housing, all of the shafts being separate but coaxial. A hub having an interior surface closely surrounds the motor and gear reduction sections and is rotatably coupled to the first and third shafts. A ring gear formed in the interior surface of the hub is in meshing engagement with the planet gears so that when the second shaft rotates at a selected speed, the hub rotates relative to the first and third shafts at a lesser speed. Preferably, the hub is at least partially filled with oil to conduct heat from the motor section to the outside.

37 Claims, 10 Drawing Sheets

U.S. PATENT DOCUMENTS

| | | | |
|---|---|---|---|
| 5,115,159 A | 5/1992 | Takamiya et al. | 310/67 |
| 5,156,579 A * | 10/1992 | Wakuta et al. | 475/161 |
| 5,215,323 A | 6/1993 | Cowan | 280/236 |
| 5,268,602 A | 12/1993 | Schwaller | 310/67 |
| 5,272,938 A | 12/1993 | Hsu et al. | 74/594.1 |
| 5,291,088 A | 3/1994 | Adam et al. | 310/88 |
| 5,293,089 A | 3/1994 | Frister | 310/114 |
| 5,341,892 A | 8/1994 | Hirose et al. | 180/220 |
| 5,382,854 A | 1/1995 | Kawamoto et al. | 310/67 |
| 5,450,915 A | 9/1995 | Li | 180/65.5 |
| 5,581,136 A | 12/1996 | Li | 310/67 |
| 5,600,191 A | 2/1997 | Yang | 310/154 |
| 5,614,799 A * | 3/1997 | Anderson et al. | 318/439 |
| 5,633,544 A | 5/1997 | Toida et al. | 310/67 |
| 5,662,187 A | 9/1997 | McGovern | 180/205 |
| 5,793,132 A | 8/1998 | Hirose et al. | 310/71 |
| 5,818,134 A | 10/1998 | Yang et al. | 310/78 |
| 6,100,615 A * | 8/2000 | Birkestrand | 310/75 C |

* cited by examiner

MODULAR MOTORIZED ELECTRIC WHEEL HUB ASSEMBLY FOR BICYCLES AND THE LIKE

RELATED APPLICATION

This application is a continuation-in-part of Ser. No. 09/076,317, filed May 11, 1998, now patent U.S. Pat. No. 6,100,615.

BACKGROUND OF THE INVENTION

This invention relates to a modular motorized wheel hub for bicycles, scooters, golf carts and other on and off road vehicles. It relates more particularly to a compact electric modular motor/wheel hub assembly which develops sufficient torque to power a variety of vehicles.

There are numerous vehicles in use today which have battery-powered electric motors to drive the wheels of the vehicle. These include bicycles, adult tricycles, wheel chairs, motor scooters, golf carts, all terrain vehicles, etc. In many such vehicles, the motor is mounted to the vehicle frame with the motor output being coupled to the wheels by way of a chain drive, gear train or the like.

There also exist in the prior art various bicycles which have an electric motor connected directly to a wheel hub and arranged to rotate that hub. In some cases, the motor is mounted outside the wheel hub and takes up considerable space; see e.g., U.S. Pat. No. 5,622,187. These are not modular assemblies. In other instances, the motor takes the place of the usual wheel hub and rotates the rim of wheel; see, e.g., U.S. Pat. Nos. 552,271; 5,272,938; 5,341,892 and 5,581,136. Such motors are also relatively large, occupying a large percentage of the area within the associated wheel rim.

There do exist a few examples of bicycle-type vehicles whose motor is located entirely within the hub of the wheel; see e.g., U.S. Pat. Nos. 572,036; 2,514,460 and 3,921,741. As to these, in some cases the hub assembly is overly wide so that it cannot be mounted to the fork of a conventional bicycle frame. In other cases, the assembly is composed of a multiplicity of separate parts which are difficult to make and do not assemble as one unit. However, the most serious disadvantage of prior motorized hub assemblies of this general type is that they tend to overheat when used for a prolonged period as the bicycle's or other vehicle's sole source of power. In other words, while those prior assemblies may operate satisfactorily as a power assist device, when used alone to drive the vehicle, they either consume too much power and drain the associated battery after only a relatively short time or they do not develop sufficient torque to enable the vehicle to travel at a sufficient speed particularly on upgrades.

SUMMARY OF THE INVENTION

Accordingly, it is an object of the present invention to provide an improved modular motorized wheel hub assembly for bicycles and other vehicles.

Another object of the invention is to provide a modular motorized hub assembly of this type which is comparable in length and diameter to a conventional non-motorized wheel hub.

A further object of the invention is to provide such a modular assembly which is composed of a minimum number of separate parts which can be assembled as one unit without requiring any special tools or other equipment.

Another object of the invention is to provide a modular motorized hub assembly which provides a high torque output in a compact package and allows use of a high speed motor to minimize the package size and weight.

A further object of the invention is to provide a motorized wheel hub assembly which does not become overheated in use.

A further object of the invention is to provide a modular motorized wheel hub assembly which has extremely high efficiency over a wide range of speeds.

Another object of the invention is to provide such an assembly which can also function as a motor generator to recharge the assembly's DC power source and provide a controllable electric vehicle brake.

A further object of this invention is to provide a controllable electric hub assembly of this type having an absolute minimum number of electrical conductors that have to be brought to outside connectors to allow all of them to pass through a small central shaft of the assembly.

Another object is to provide such a motorized hub assembly which is especially suited for powering a small urban vehicle or even a boat propeller so as to provide high torque at low speed and lower torque at high speed.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

In general, my assembly comprises modular DC electric motor incorporated into a wheel hub having stationary collinear shafts projecting from opposite ends of the hub. The motor stator is mounted inside a stationary stator case or shell inside the hub which case is connected to one of the shafts. Planet gears comprising a gear reducer are rotatably mounted to the case which gears mesh with a ring gear formed on the inside wall of the hub. These planet gears are rotated by a small diameter sun gear or pinion which rotates with a motor rotor positioned within the stator. Electrical connections to the stator are made through one of the shafts by which power may be provided to the stator causing the rotor to rotate. The rotor turns the pinion which then rotates the planet gears causing the hub to rotate relative to the shafts which are fixed in use.

A sprocket with a one-way clutch may be incorporated into the hub assembly so that if the motor rotates the hub faster then the sprocket is rotated (as on a power-assisted bicycle), the sprocket will free wheel. In addition, if the associated wheel is braked or raised from the ground and rotated manually, the motor can function as a generator to recharge the batteries that power the motor.

The hub is sealed from the atmosphere and internal lubrication channels are provided for circulating a fluid which transfers heat from the motor in the stator case and the gear reducer to the hub where it is conducted to the outside thereby allowing the motor to operate with a high torque output for a prolonged period without overheating.

The motor is basically a high performance, variable speed, brushless, sensorless, internally cooled, three-phase, computer balanced motor/generator with extremely wide band efficiencies approaching 95% with 90% efficiency down to and below 20% maximum speed. This high performance motor is married to an unusually small very efficient planetary gear reducer resulting in an unusually compact motorized hub assembly for a vehicle.

As will be seen later, the modular assembly is composed of a minimum number of parts which are relatively easy to

BRIEF DESCRIPTION OF THE DRAWINGS

For a fuller understanding of the nature and objects of the invention, reference should be made to the following detailed description taken in connection with the accompanying drawings, in which.

DETAILED DESCRIPTION OF AN ILLUSTRATIVE EMBODIMENT

Figure 1:
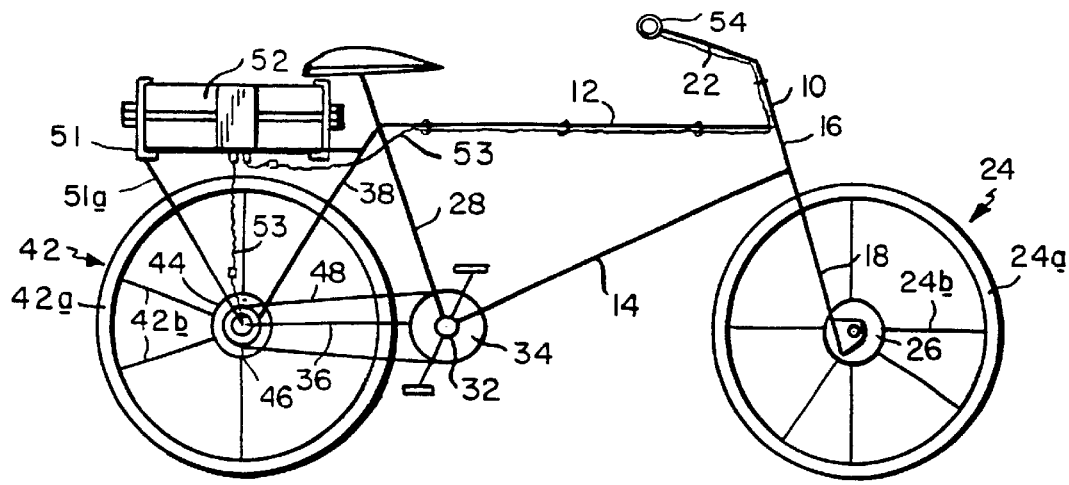
FIG. 1 is a diagrammatic view of a bicycle incorporating motorized hub assemblies according to the invention in the front and rear wheels of the bike.

Refer now to FIG. 1 which shows a bicycle which includes a more or less standard frame 10 with upper and lower reach bars 12 and 14, a head post 16 mounted to the forward ends of the reach bars, a front fork 18 rotatably mounted to head post 16, the front fork being rotated by handle bars 22. A front wheel 24 is rotatably mounted between the tines of the front fork 18, the wheel including a rim 24a connected by radial spokes 24b to a motorized hub assembly 26 incorporating the invention and mounted to the lower end of the front fork 18.

The upper and lower reach bars 12 and 14 extend back to a seat post 28, with the lower end of the seat post and the lower reach bar joining at a sprocket tube 32 which rotatably supports a pedal sprocket 34. Extending rearwardly from the sprocket tube is a rear fork 36 which, along with a bifurcated rear brace 38 rotatably supports a rear wheel 42. Wheel 42 includes a rim 42a, and radial spokes 42b which extend to a hub assembly 44 according to the invention and mounted to the rear end of rear fork 36. In the bicycle depicted in FIG. 1, the hub assembly 44 includes a rear sprocket 46 which is connected by a chain 48 to pedal sprocket 34.

A battery pack/control unit 52 is supported on a rack 51 extending rearwardly from seat post 28 over the rear wheel 42 which rack is braced by a pair of struts 51a extending down to the rear axle of the bike. Unit 52 is connected by 3-wire cords 53 one each to hub assemblies 26 and/or 44 and one to a combination electronic throttle regenerative brake control 54 incorporated into handlebars 22. When actuated, control 54 causes control unit 52 to operate hub assembly 44 in a regenerative braking mode so that the forward motion of the bike may be slowed or stopped. A conventional hand operated caliper brake (not shown) may be associated with the front wheel rim 24a.

Thus, the bicycle in FIG. 1 can be powered by the rider pedaling on crank 34 and/or by the motorized front wheel hub assembly 26 and/or by the motorized rear wheel hub assembly 44. Also, of course, either the front hub assembly 26 or the rear hub assembly 44 may be replaced by a conventional front or rear wheel hub.

Figure 2:
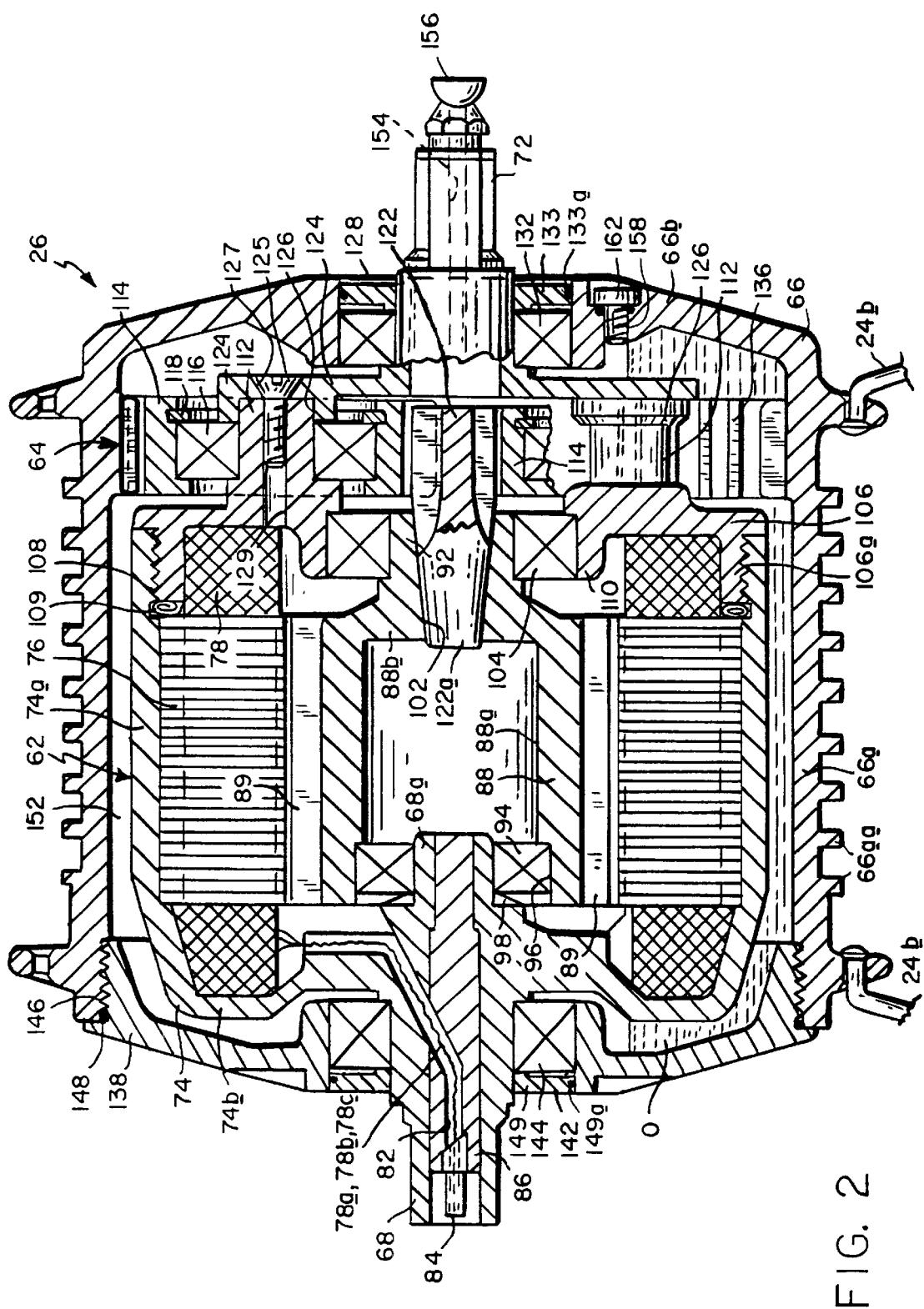
FIG. 2 is a longitudinal sectional view of the hub assembly in the front wheel of the FIG. 1 bike.
Figure 5:
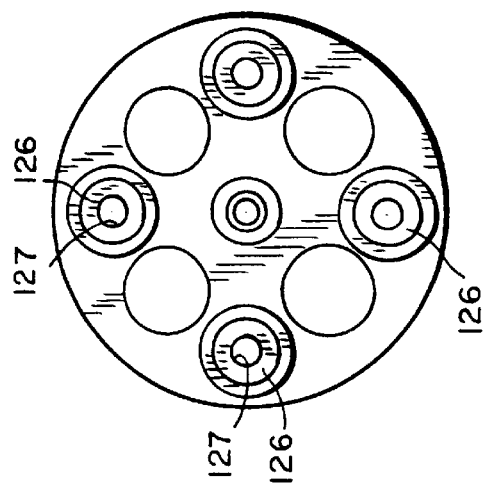
FIG. 5 is a plan view taken along line 5—5 of FIG. 3.

Refer now to FIG. 2 which shows the front wheel hub assembly 26 in greater detail. That assembly comprises modular brushless, sensorless, 8-pole DC electric motor shown generally at 62 which drives a single stage planetary gear reducer indicated generally at 64 so as to rotate an outer hub 66 relative to a pair of collinear stub shafts 68 and 72 which, in use, are fixed to the lower end of the bicycle's front fork 18 (FIG. 1). Hub 66 is connected by spokes 24b to the wheel rim 24a so that when the motor 62 is energized by the battery pack/control unit 52 (FIG. 1), the rotator rotates the wheel 24.

Motor 62 comprises a cup-like stator case 74 having a cylindrical side wall 74a and a generally discoid end wall 74b. The shaft 68 extends out axially from the center of end wall 74b. The stator case 74 contains a lamination stack 76 and a toroidal 3-wire, 3-phase WYE-connected winding 78. The three winding wires 78a, 78b and 78c are brought out of case 74 through a passage 82 in the case end wall 74b and shaft 68, those wires extending to a 3-pole connector 84 incorporated into the outer end of shaft 68. To facilitate conducting the wires out of the case, the shaft 68 may be formed as a tube as shown and filled with a plug 86 of an epoxy material. Alternatively, the shaft 68 may be a separate piece from the case 74 press fit to the case end wall 74b from the inside thereof. In that event, integral tabs on the shaft may engage slots in the end wall of the stator case 74 to rotatably fix the shaft to the case. This construction allows the wires 78a–78c from winding 78 to be threaded through shaft 68 before the shaft and winding are seated in the stator case 74. This somewhat simplifies the threading of those wires.

Also positioned in the stator case 74 at the axis of winding 78 is a cup-like rotor 88 having a cylindrical side wall 88a and an end wall 88b which faces the open end of the stator case 74. A tubular shaft 92 projects axially from the center of end wall 88b to a location just beyond the open end of shell 74. The rotor has eight generally rectangular, longitudinally extending, alternately north and south pole permanent magnets 89 spaced around its circumference.

Still referring to FIG. 2, in order to rotatably mount rotor 88 at the axis of the hub assembly 26, the shaft 68 is provided with an inner end extension 68a which projects into case 74. That extension is stepped in order to seat the inner race of a circular bearing 94, the outer race of which is received in a counterbore 96 present at the open end segment of the rotor side wall 88a. Preferably, a spring washer 98 is present between bearing 94 and its seat in shaft extension 68a to provide compliance and to preload the bearing to minimize noise when the assembly is in operation.

The rotor end wall 88b and tubular shaft 92 projecting therefrom have an axial passage 102 which is tapered for reasons that will become apparent. Also, the radially outer wall of shaft 92 is stepped in order to provide a seat for the inner race of a circular bearing 104.

Figure 3:
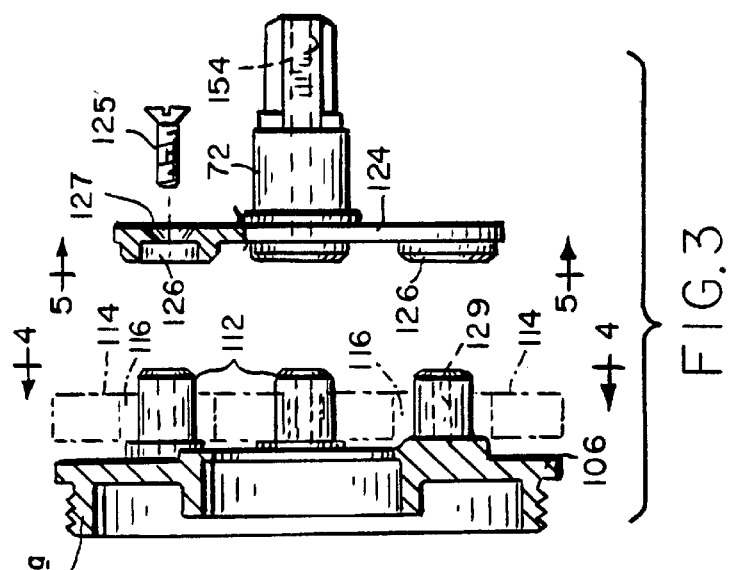
FIG. 3 is an exploded elevational view showing the components of the gear reducer in the FIG. 2 assembly in greater detail.
Figure 4:
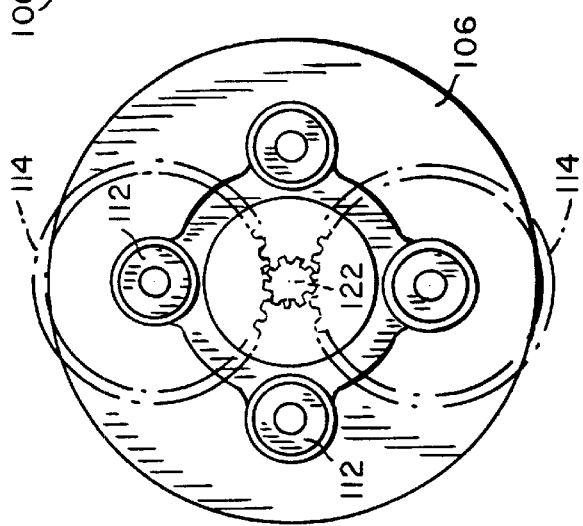
FIG. 4 is a plan view taken along line 4—4 of FIG. 3.

As best seen in FIGS. 2 to 4, the open end of the stator case 74 is closed by an annular end cap 106 to form a motor housing. The end cap includes a circular flange or side wall 106a which is exteriorly threaded to mate with similar threads 108 inscribed in the stator case side wall 74a at the open end of the case. Preferably, an O-ring 109 is placed between those two elements to provide compliance and a fluid-tight seal there. The threads are glued at final assembly so that the structure can transmit torque in both directions without unscrewing.

The end cap 106 is also provided with a radially inner circular flange or collar 110 which forms a seat for the outer race of bearing 104 so that when the end cap is tightened onto the stator case 74, the opposite ends of the rotor are rotatably supported by their respective bearings 94 and 104 for rotation about the common axis of the shafts 68 and 72 which constitutes the rotary axis of the hub assembly 26 as a whole. Also, when cap 106 is tightened onto case 74, the cap side wall or flange 106a compresses the O-ring 109 against the lamination stack 76 of the motor thereby taking up any dimensional tolerances between the lamination stack length and the various machined parts of the motor. Thus the stator case 74 and cap 106 fully enclose the internal elements of motor 62, i.e., they form a sealed stator case that protects those elements from the environment outside the motor. In this connection, we should mention that the bearing 104 which is seated in end cap 110 is a sealed bearing so that fluids from the outside cannot pass through that bearing into case 74.

Still referring to FIGS. 2 to 4, end cap 106 also carries components of the gear reducer 64. More particularly, a plurality of posts 112 project from the outer face of cap 106. In the illustrated assembly, there are four such posts 112 arranged in a circle. Two of these posts, i.e., the upper and lower ones, function as axles for a pair of annular planet gears 114 which are rotatably mounted to those axles by way of circular bearings 116. Preferably, the posts and the inner walls of the gears are stepped to provide seats for the bearings with the outer races of the bearings being retained on their respective gears by snap rings 118 (FIG. 2).

The planet gears 114 mesh with a small diameter sun gear or pinion 122 projecting axially from the rotor shaft 92 between those gears. The sun gear includes a shaft extension 122a which is dimensioned and tapered so as to wedge very tightly into the tapered passage 102 in rotor shaft 92 so that the sun gear and rotor turn in unison.

The posts 112 extend out somewhat beyond the bearings 116 which support the planet gears 114. This allows the bearings, and therefore the gears, to be captured by a rigid retaining disk 124 mounted coaxially to the inner end of the assembly's shaft 72. More particularly, the inner face of disk 124 is formed with a circular array of four receptacles or sleeves 126 which are dimensioned and arranged to receive the projecting ends of posts 112, with the ends of the upper and lower sleeves bearing against the inner races of the bearings 116. Thus, the planet gears 114 are secured to the stator case end cap 106 but can be rotated about their axes by the sun gear 122 which is spaced slightly from disk 124 as shown in FIG. 2 so that there is minimal frictional contact between the sun gear and the disk.

Preferably, the disk 124 is releasably secured to end cap 106 by threaded fasteners 125 which extend through countersunk holes 127 in disk 124 and are turned down into threaded passages 129 in posts 112.

Referring to FIG. 2, the assembly's hub 66 is a cup-like member which is arranged to receive and surround motor 62 and the planet gears 114 of the gear reducer 64. Hub 66 includes a cylindrical side wall 66a and an annular end wall 66b which may be slightly dished as shown in FIG. 2. The end wall 66b has a central opening 128 which provides clearance for shaft 72. Opening 128 is counterbored to provide a seat for the outer race of a self lubricating and sealed shaft bearing 132 which allows hub 66 to rotate freely relative to that shaft. Preferably, a nut 133 having a peripheral O-ring 133a is screwed onto a threaded segment of shaft 72 next to bearing 132 to secure the bearing and to provide a seal with the wall of opening 128.

The final component of gear reducer 64, namely a ring gear 136, is formed on the inside surface of hub side wall 66a opposite planet gears 114. As shown in FIG. 2, the planet gears 114 extend out somewhat beyond the side wall of motor 62 so as to mesh with the teeth of the ring gear 136.

The motor 62 and the components of the gear reducer 64 are assembled to hub 66 by sliding them, shaft 72 first, into the open end of the hub until disk 124 seats against bearing 132. They are retained within the hub by an annular end cover 138. The end cover has a central passage 142 which provides clearance for the assembly's shaft 68, there being a circular, self-lubricating and sealed shaft bearing 144 provided between the shaft and the wall of passage 142 so that the end cover 138 is free to rotate along with hub 66 relative to shaft 68. The periphery of the end cover 138 is threaded so that the end cover can be screwed into the open end of hub 66. For that, the inner wall of the hub side wall 66a has internal threads 146 which mate with the threads on the end cover. When the end cover is screwed tightly to the hub, all of the components of the assembly are held together in the proper coaxial relationship. Preferably, an O-ring 148 is present between the end cover and the hub to provide a fluid tight seal at that location and the is threads are glued to prevent unscrewing during motor operation.

Preferably also, a nut 149 having a peripheral O-ring 149a is screwed onto a threaded segment of shaft 68 adjacent to bearing 144 to secure the bearing and to provide a seal with the wall of passage 142.

It will be apparent from the foregoing that when my assembly is in use, shafts 68 and 72 which are mounted to the bicycle frame 10 (FIG. 1) are stationary as is stator case 74, end cap 106 and retaining disk 124 which are all secured together. Therefore, when the stator winding 78 of motor 62 is energized, rotor 88 and sun gear 122 connected thereto rotate at a speed which may be varied from 0 to 4000 RPM or higher. The sun gear, in turn, rotates the planet gears 114 of gear reducer 64 which, in turn, cause hub 66 carrying ring gear 136 to rotate. In a typical assembly, the sun gear 122 may have 6 teeth and each planet gear 114 may have 30 teeth while the ring gear 136 may have 66 teeth.

This gives the single stage gear reducer 64 a gear reduction ratio of 11:1.

It is important to note at this point that my hub assembly does not have a through shaft. In other words, the sun gear or pinion 122 which is connected to motor rotor 88 is completely separate from both shafts 68 and 72. Therefore, it is subjected to no bending forces. This means that the sun gear or pinion 122 on the bike models can be very small, e.g., 0.50 in. in diameter. This, in turn, allows the use of large diameter planet gears so that the single stage gear reducer 64 can provide a large gear reduction, e.g., 11:1, in a small package. This efficient compact larger gear reduction, for a given output speed and torque, allows a higher RPM motor, which, in turn, allows the motor and entire hub to be made much smaller for a given power rating.

It is also a feature of the invention that the assembly's motor 62 has a stationary stator which is located very close to the side wall 66a of the rotary hub 66, being separated by a narrow, e.g., 0.15 in., annular gap 152. This means that there is efficient transfer of heat generated in the winding 78 to the hub side wall 66a which heat is then dissipated to the outside. To accelerate this process, the hub side wall 66a may be provided with a series of circumferential cooling fins 66a to increase the exterior surface area of the side wall.

Cooling of the modular assembly may be optimized by circulating a cooling agent or lubricant within the assembly. More particularly in the FIG. 2 assembly, the shaft 72 is provided with an axial passage 154 and an oil or grease fitting 156 at the outer end of the shaft which allows a lubricant such as oil O to be introduced into the assembly so that the oil fills hub 66 up to the level of an internally threaded oil level passage 158 present in the hub end wall 66b. When the oil O reaches the desired level, the passage 158 may be closed by a threaded plug 162.

When the assembly is stationary, the oil O collects at the bottom of the assembly at a level below that of the self-lubricating and sealed main shaft bearings 132 and 144 as shown in FIG. 2. Therefore, when the assembly is at rest, there is no possibility of oil leakage from the assembly. On the other hand, when the assembly is in operation, the oil O is thrown radially outward away from the bearings 132 and 144 by centrifugal force. The oil is circulated and splashed around the interior of hub 66 by the relative rotary motions of the planet gears 114 and hub 66. Thus, heat generated by the motor 62 and the gear reducer 64 is transferred to the oil which is circulated through the gap between disk 124 and hub end wall 66b and between end cover 138 and the stator case end wall 74b and between the stator case side wall 74a and the hub side wall 66a so that the heat is carried efficiently to the outside shell of the assembly which is both rotating and translating through the air stream where the heat is dissipated to the atmosphere. This enables the assembly to operate at maximum power for a prolonged period without overheating.

It is important to note also that the oil O is excluded from the stator case 74 and is completely isolated from the electrical wires 78a to 78c which conduct power from the to connector 84 to the stator winding 78 so that the oil has no effect at all on the operation of the motor 62. Yet, there is only one bearing and one seal between the elements of motor 62 and the oil, i.e., bearing 104 and O-ring 109.

A modular motorized hub assembly constructed in accordance with FIGS. 2 to 5, having a length (not including the protruding shafts 68 and 72) of only about 4.25 inches, a diameter of less than 4.5 inches and a weight of less than 2.5 Kg. or 5.5 pounds is able to produce a power output of 300 or more watts which is more than three times what a typical human can produce. Therefore, the hub assembly 26 is capable of propelling the FIG. 1 bicycle up relative steep grades with ease.

Figure 6:
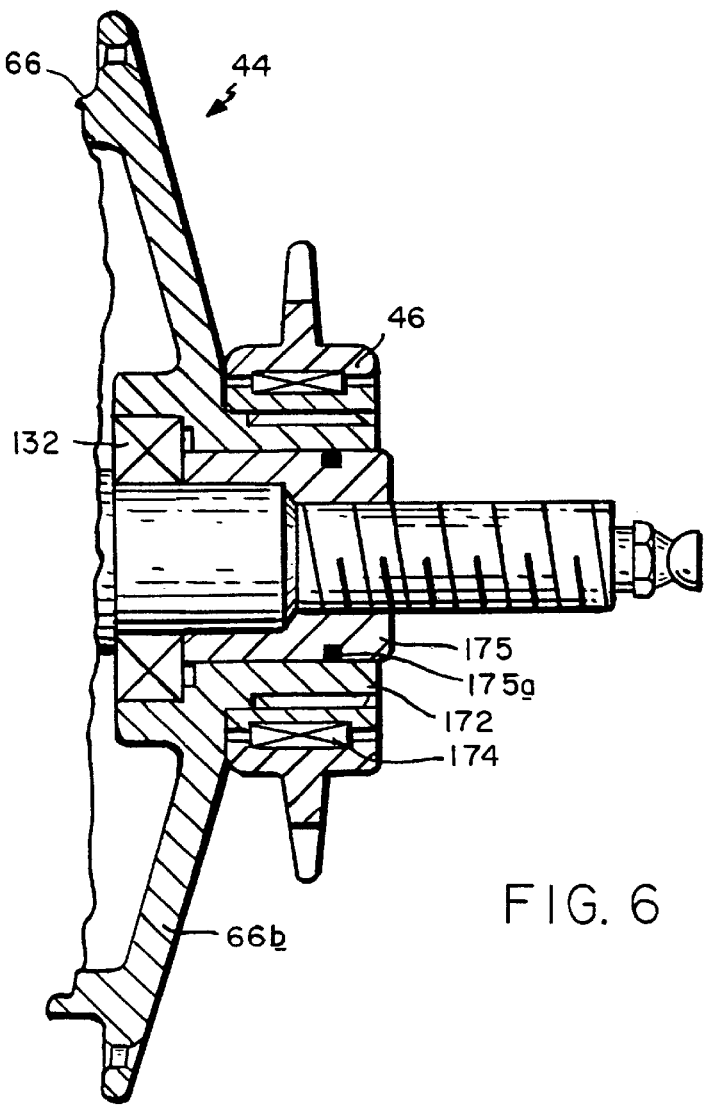
FIG. 6 is a fragmentary sectional view of another motorized hub assembly embodiment that drives the rear wheel of the FIG. 1 bicycle.

Refer now to FIGS. 1 and 6 which illustrate the rear wheel hub assembly 44 of the FIG. 1 bicycle. Assembly 44 is very similar to assembly 26 and accordingly, the similar parts thereof carry the same identifying numerals. The only real differences between the two are that the shaft 72 of assembly 44 is longer than the corresponding shaft of assembly 26 and the hub end wall is provided with an axially extending flange 172 which functions as a hub for the sprocket 46 and a one-way or overrunning clutch 174. Preferably, a nut 175 having a peripheral O-ring 175a is threaded onto a segment of shaft 72 to secure bearing 132 and to provide a seal with flange 172. Also, in some applications bearing 132 may include a needle bearing to offset axial thrust. The inclusion of sprocket 46 enables the hub 66 of assembly 44 (and rear wheel 42 as a whole) to be rotated manually by sprocket 46 and its chain drive or by the motor 62 in assembly 44 or by a combination of both power sources. If the motor 62 rotates hub 66 faster than sprocket 46, the sprocket will free wheel due to the presence of the clutch 174.

If no power is applied by the bicycle's battery pack/controller unit 52 to the motor 62 in the rear hub assembly 44 and the rear hub 66 is rotated by way of the chain drive and sprocket 46, that motor can function as a generator to deliver electric current back to unit 52 in order to recharge the battery pack therein. In fact, to facilitate such recharging, the FIG. 1 bicycle may be equipped with a stand (not shown) which may be swung down to support the rear wheel 42 off the ground. The rider can then pedal the pedal crank 34 at a high rate. This will turn hub 66 to cause motor 62 to become an electric generator and to produce a DC output that will efficiently charge the battery pack in unit 52.

When the regeneration brake control 54 (FIG. 1) is actuated, the motor 62 in hub assembly 44 (and/or 26) will operate as a generator and brake to slow or stop the forward motion of the bicycle, recapturing and returning this energy to the battery pack in unit 52.

Figure 7:
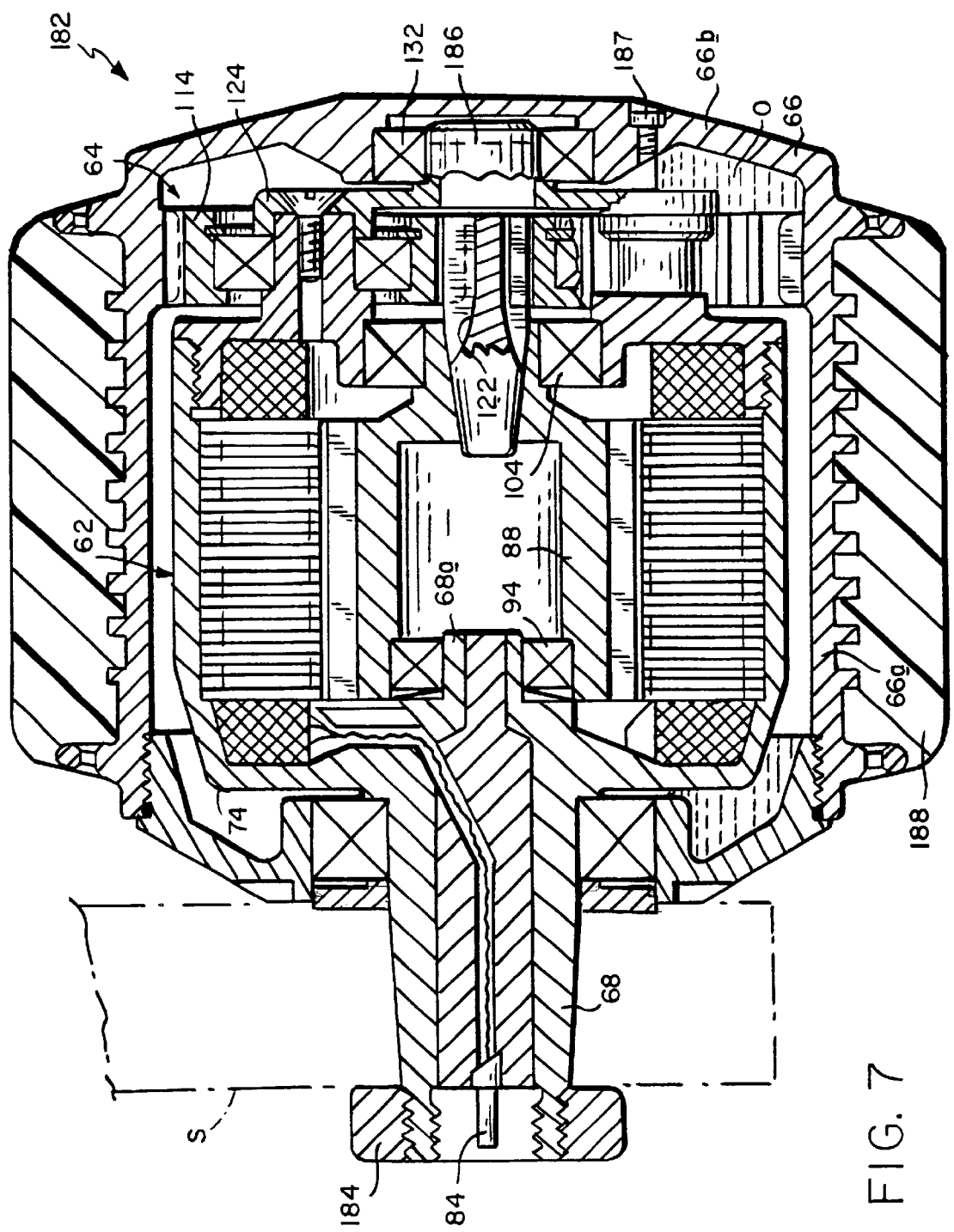
FIG. 7 is a view similar to FIG. 2 of still another motorized hub assembly embodiment incorporating the invention.

FIG. 7 shows a cantilevered modular motorized hub assembly 182 suitable for powering wheel chairs, all terrain vehicles, steerable front wheels of tricycles, etc. Assembly 182 is somewhat similar to assembly 26 depicted in FIG. 2. Therefore, corresponding parts bear the same identifying numerals. The main difference between the two modular assemblies is that assembly 182 is supported only by shaft 68, i.e., there is no shaft 72 at the opposite end of the assembly. Accordingly, shaft 68 is larger and shaped to be mounted to a suitable frame member or support S shown in phantom. The outer end segment of shaft 68 is exteriorly threaded to accommodate a nut 184 which may be screwed onto the end of the shaft to secure the assembly to support S. Also, the retaining disk 124 which retains the planetary gears 114 of gear reducer 64 has an axially extending stub shaft 186 in lieu of a shaft 72 which allows the end wall 66b of hub 66 to be continuous or closed over the end of stub shaft 76 as depicted in FIG. 7. An oil fill/drain fitting 187 is present in the hub end wall 66b allowing oil O to be introduced into the hub 66 for the reasons described above.

Finally, while assembly 182 could rotate a spoked wheel as in FIG. 2, the illustrated cylindrical wall 66a of hub 66 is instead surrounded by a small cast tire 188 of urethane or other such rugged, resilient material.

Figure 8:
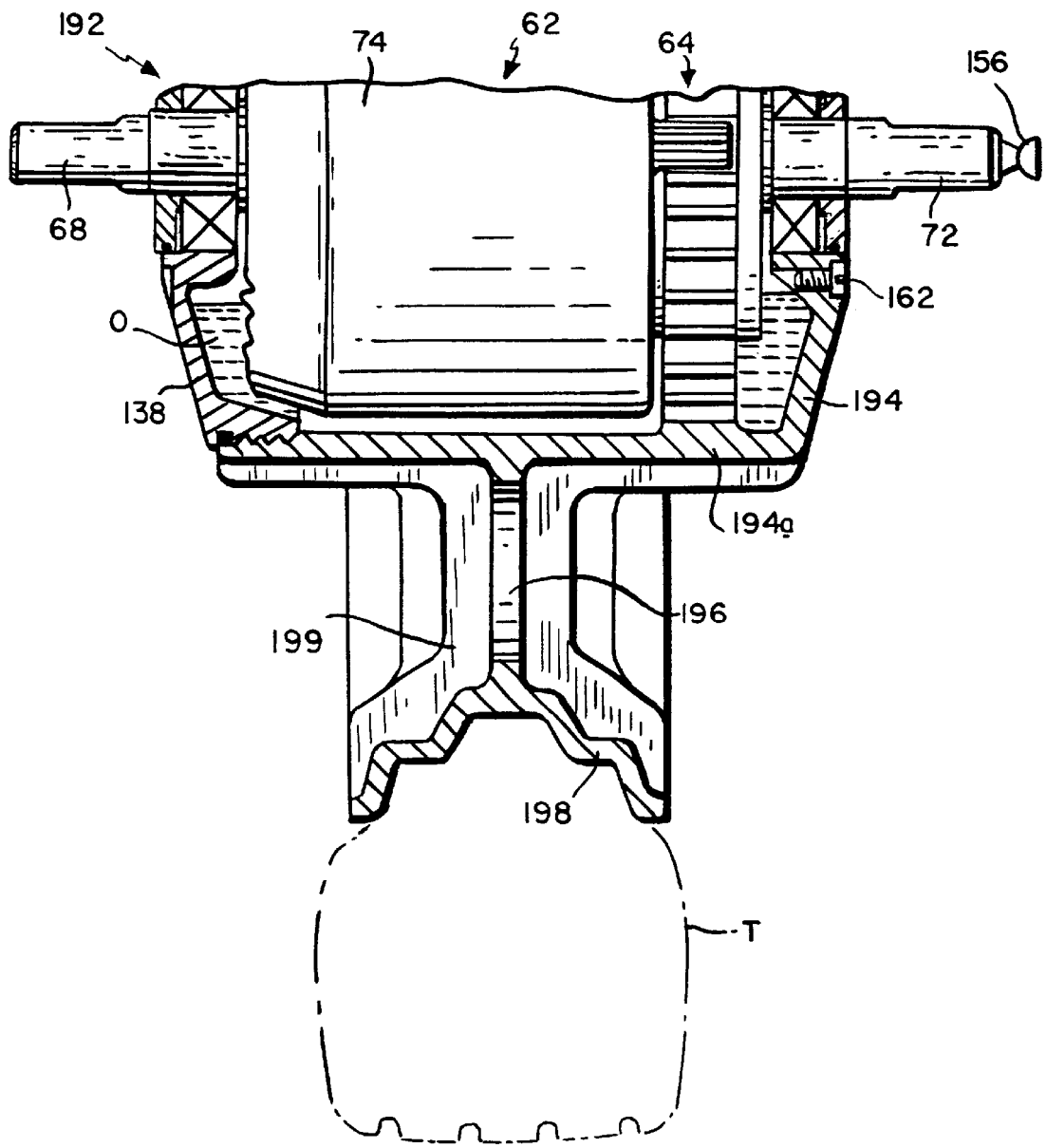
FIG. 8 is a fragmentary sectional view showing an automobile wheel having a hub assembly incorporating the invention.

Turn now to FIG. 8 which shows a modular motorized hub assembly 192 for driving the wheel of a scooter, golf cart or other small vehicle. The interior of assembly 192 is essentially the same as assembly 26 depicted in FIG. 2. However, assembly 192 has a rotary hub 194 whose cylindrical side wall 194a is formed with a circumferential, radially extending flange 196 which leads to a tire rim 198. In use, the rim 198 may support a standard tire T. Preferably, a circular array of radial fins 199 provided in flange 196 to encourage centrifugal air circulation past, and cooling of, the hub 194.

Figure 9:
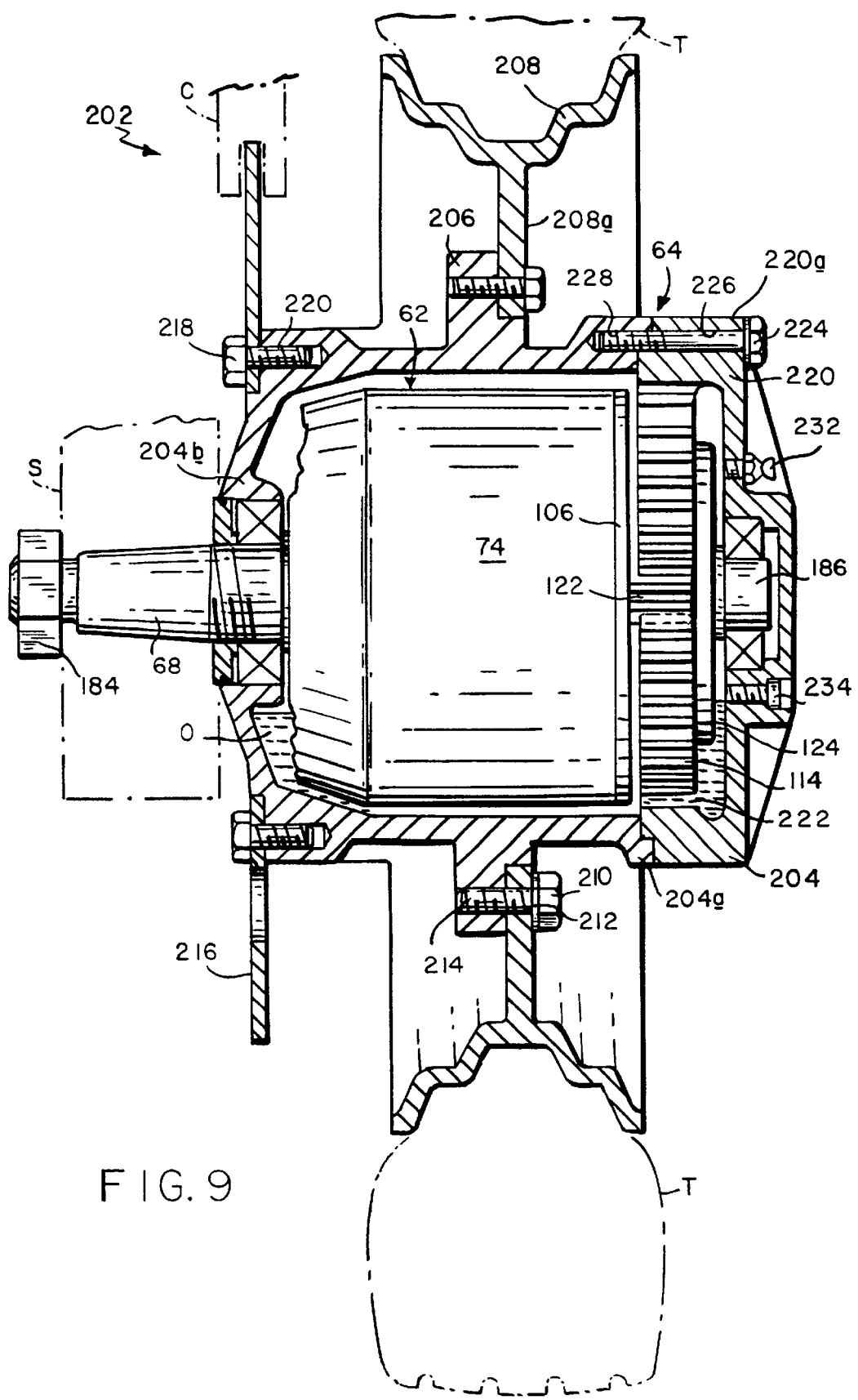
FIG. 9 is a sectional view similar to FIG. 7 of still another hub assembly embodiment.

Referring now to FIG. 9, there is shown there another modular hub assembly 202 which is cantilever-mounted like the one depicted in FIG. 7 and which is suitable for rotating a wheel with a standard tire as is the case with the FIG. 8 embodiment. The interior of assembly 202 is essentially the same as assembly 182 shown in FIG. 7. However, assembly 202 has an hub 204 which is different from those in the previously described embodiments. More particularly, the hub 204 is a cast part with a radially ribbed cylindrical side wall 204a for strength and cooling effect and an end wall 204b located at the end of the hub adjacent to shaft 68 instead of at the opposite end as in FIG. 7. The side wall 204a encircles the assembly's motor 62 but stops short of the gear reducer 64. Side wall 204a is formed with an external circumferential flange 206 midway along its length. Flange 206 provides a seat for an annular tire rim 208 having a radially inwardly extending fin or flange 208a whose inner diameter is slightly larger than that of the hub wall 204a. The tire rim may be releasably secured via rim 208a to hub flange 206 by a circular array of bolts 210 which extend through holes 212 in fin 208a and are turned down into threaded holes 214 in the hub flange 206.

Thus, if the tire and/or rim 208 should become damaged, it can be removed from the hub assembly 202 without having to detach that assembly from its support S. Hub assembly 202 also includes provision for mechanically braking hub 204. More particularly, an annular perforate brake disk 216 is mounted to the hub end wall 204b by means of a circular array of bolts 218 which extend through appropriate holes in the disk and are turned down into threaded holes 220 in end wall 204b. To slow the hub, the disk 216 may be frictionally engaged by conventional brake calipers C shown in phantom.

The open end of hub 202 adjacent gear reducer 64 is closed by an end cover 220 which completely covers the stub shaft 186 projecting from the retaining disk 124. End cover 220 includes a cylindrical side wall 220a which is arranged to interlockingly seat against the rim of the hub side wall 204a. In this embodiment, the interior surface of the end cover side wall 220a is formed with a ring gear 222 which meshes with the teeth of the planet gears 114 of the gear reducer 64.

The end cover 220 is secured to the hub wall 204a by a circular array of bolts 224 extending through holes 226 in the end cover and turned down into threaded passages 228 in the hub side wall 204a.

Preferably, an oil fitting 232 and plug 234 are installed in the end cover 218 so that the hub 204 may be partially filled with cooling oil O as described above in connection with FIG. 2.

For relatively high power versions of the FIG. 9 assembly, e.g., 5 kilowatts or more, suitable for driving dune buggies, small city cars, etc., circulation of coolant oil O through the assembly may be facilitated by an external pump which circulates the oil in a closed loop between an external reservoir, the vehicle's radiator and the various hub assemblies on the vehicle. In this event, the necessary oil connections to each assembly may be made via fittings on shaft 68 in lieu of the fittings 232, 234 on hub 204. These shaft fittings would route the oil to and from the interior of the assembly. A solenoid valve may be incorporated in the external oil loop to turn on the external pump at vehicle start-up so as to "prime" the assembly's internal oil pump comprised of the rotating sun gear 122 and planet gears 114 as described above.

A distinct advantage of the FIG. 9 hub assembly 202 is the fact that the end cover 220 may be removed to gain access to the interior of the assembly for maintenance and repair purposes without having to remove the hub from its support S or the wheel rim 208 from the hub. Also, if the rotor 88, pinion 122 and/or ring gear 222 becomes damaged, only the end cover 220 has to be replaced.

Figure 9A:
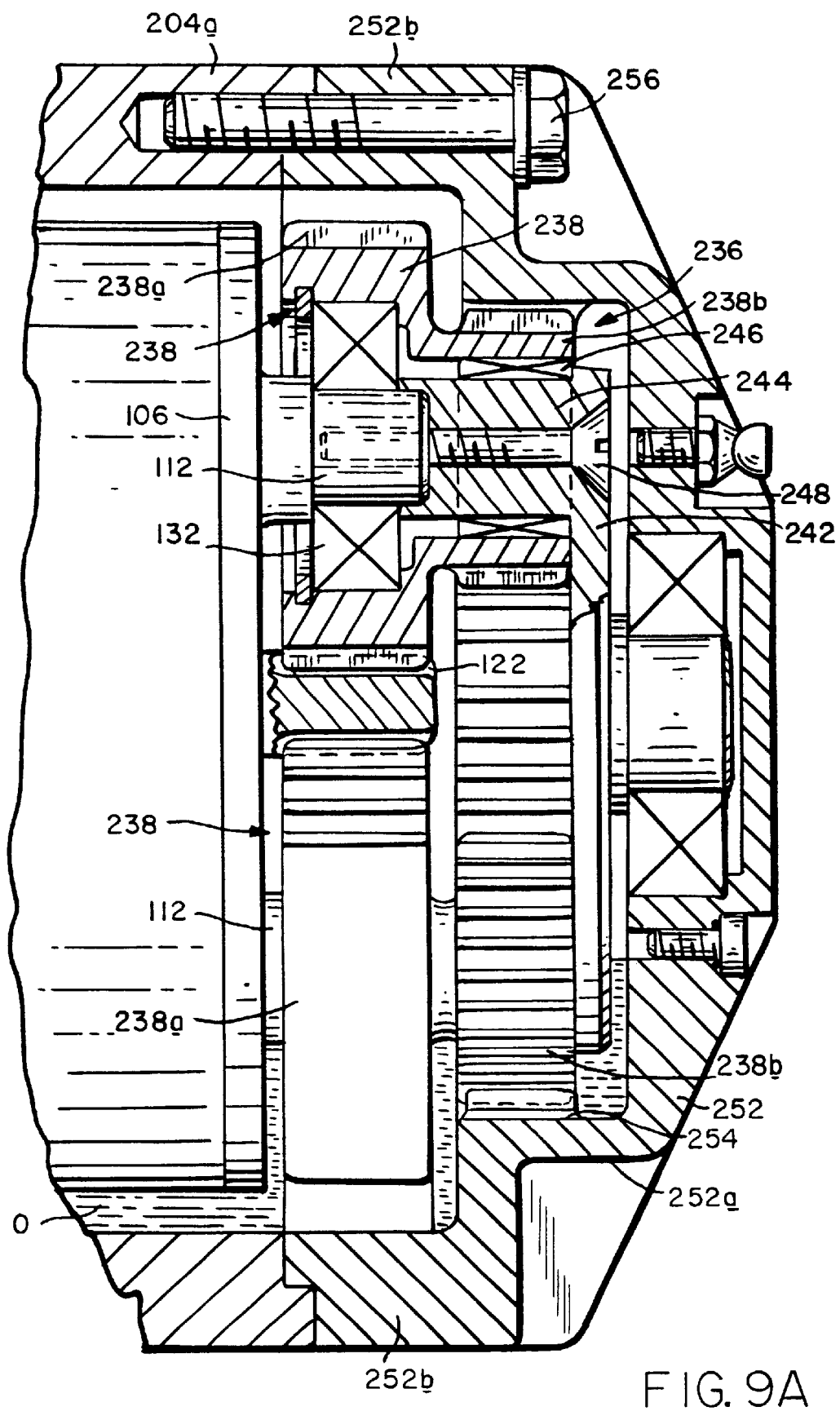
FIG. 9A is a fragmentary sectional view on a larger scale illustrating the FIG. 9 assembly with a two-stage gear reducer.

Another advantage of the FIG. 9 construction is that the single stage gear reducer 64 can easily be substituted for by a two-stage gear reducer 236 as shown in FIG. 9A so as to give the overall hub assembly a higher gear reduction ratio, e.g., 15:1.

The two-stage gear reducer 236 shown in FIG. 9A differs from the single stage gear reducer 64 described previously primarily due to the fact that it has two-part planet gears 238 rotatably mounted on the posts 112 which project from the retaining disk 106. Each of the two gears 238 includes a first relatively large diameter spur gear section 238a which meshes with sun gear 122 and a second smaller diameter spur gear section 238b which extends axially beyond the corresponding post 112. As before, the planet gears 238 are rotatably secured to posts 112 by a retaining disk 242. Here, however, the retaining disk has receptacles or sleeves 244 which project through gear section 238b and are counter-bored to capture the ends of the associated posts 112. Sleeves 244 provide seats for circular bearings 246 so that the gear segments 238b are free to rotate relative to sleeves 244. The retaining disk 242 is secured to the posts by threaded fasteners 248 which extend through the sleeves and are screwed into the ends of posts 112 as before.

The assembly in FIG. 9A is provided with an end cover 252 which is similar to end cover 220 in FIG. 9, except it is dimensioned and shaped to accommodate the extra length of the two-stage gear reducer 236. Most importantly, the end cover 252 has a stepped side wall having a first side wall portion 252a which encircles the spur gear sections 238b. That portion is formed on its interior surface with a ring gear 254 which meshes with the teeth of the spur gear sections 238b of both planet gears 238. A second side wall portion 252b of end cover 252 encircles the spur gear sections 238a with appreciable clearance and seats against the end of the hub side wall 204a. As in the FIG. 9 hub assembly, the end cover 252 is secured to the hub side wall 204a by a circular array of bolts 256.

Of course, the two-piece hub construction with the separable ring gear and one or two-stage gear reducer shown in FIGS. 9 and 9A can also be incorporated into the hub assemblies depicted in FIGS. 2 and 7 to obtain the above-described advantages for those assemblies, i.e., easy repair and change of gear reduction ratio. Similarly, other aspects of the various assembly embodiments described above are interchangeable depending upon the particular application.

Figure 10:
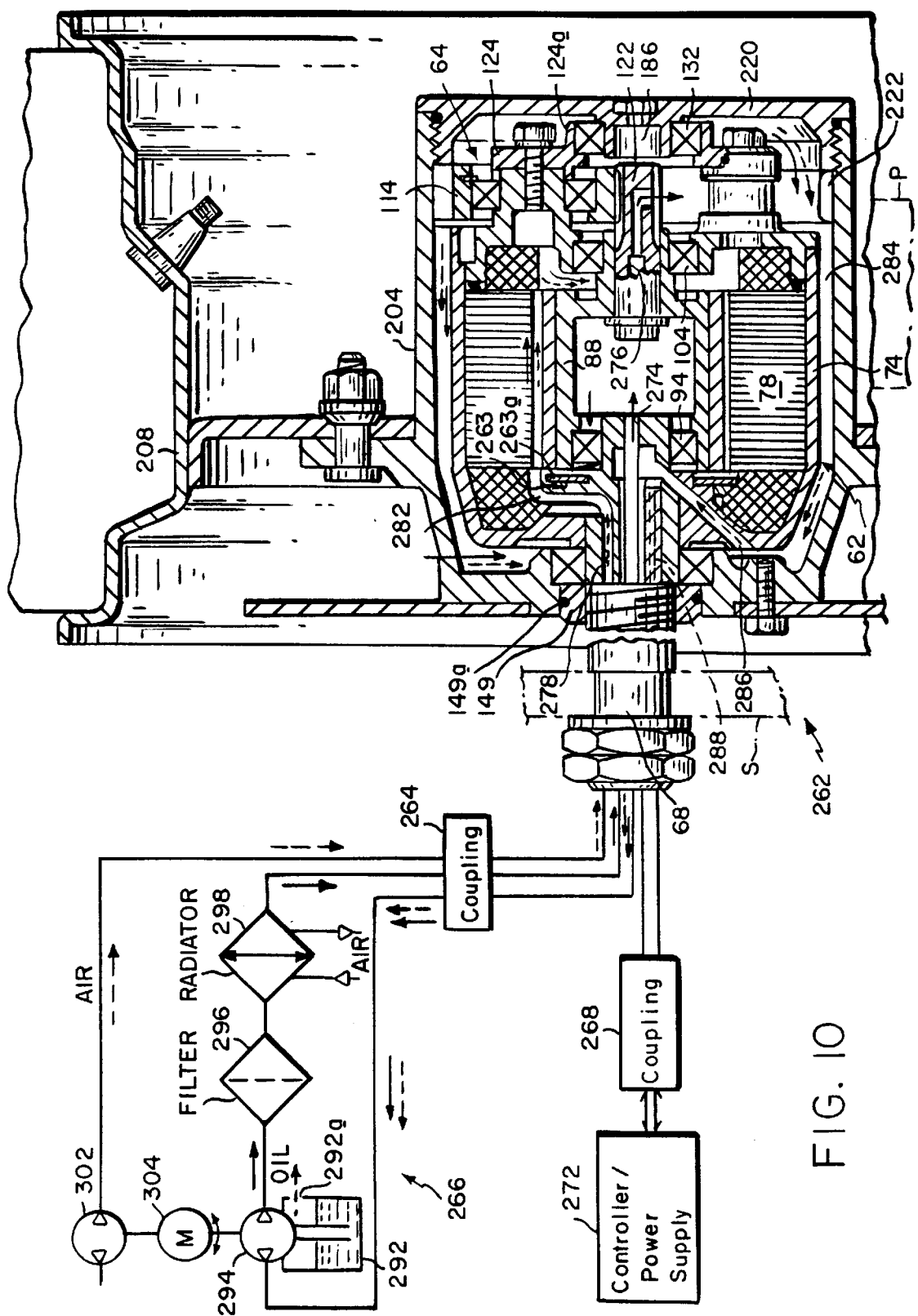
FIG. 10 is a view similar to FIG. 2 of yet another motorized hub embodiment with recirculating lubricant and suited for driving an urban vehicle or a boat.

FIG. 10 illustrates a hub assembly shown generally 262 which develops high torque at lower speeds and low torque at higher speeds giving the assembly an ideal torque/speed curve for an urban vehicle such as an electric automobile. As we shall see, it is over 95% efficient over most of its operating range. Also, it has a recirculating lubricant/coolant as well as air injection into the hub assembly motor to reduce high RPM friction. As such, the assembly may have a power rating up to at least 100 kilowatts.

The hub assembly 262 is structurally similar to the hub assembly depicted in FIG. 9. Therefore, the in-common elements of the FIG. 10 assembly have the same identifying numerals as the corresponding parts of the FIG. 9 (and FIG. 2) assembly. When used to propel a vehicle such as an automobile, assembly 262 is mounted via its shaft 68 cantilever fashion to a suitable support S. Shaft 68 connects to the hollow rotor 88 of motor 62 which rotates within stator case 74 containing the motor's stator 78. Rotor 88 rotates pinion 122 which delivers torque to gear reducer 64 whose gears 114 mesh with ring gear 222 inscribed in the outer case 204 to which a wheel 208 may be mounted as shown in FIG. 10. Thus, when hub assembly 262 is in operation, since shaft 68 is fixed to support S, outer case 204 rotates wheel 208.

Assembly 262 differs from the others in that it includes a plurality of Hall sensors 263 mounted to an annular circuit board 263a positioned at the left end of stator 78 opposite that end of rotor 88. These sensors sense the magnet fields produced by the poles of rotor 88 in order to switch the windings of stator 78 to provide commutation for the brushless motor 62.

Shaft 68 of assembly 262 is connected via a coupling 264 to a coolant loop shown generally at 266. The shaft is also connected via a coupling 268 to a controller/power supply 272. The controller/power supply 272 may be similar to the one disclosed in applicant's copending application Ser. No. 09/291,703, filed Apr. 14, 1999, the contents of which is hereby incorporated by reference herein.

Shaft 68 has an axial passage 274 for delivering oil from loop 266 to the interior of rotor 88 following the path shown by solid line arrows in FIG. 10. That oil is conducting by an axial passage 276 in pinion 122 to the elements of the gear reducer 64. Also, a gas such as air from loop 266 is circulated through the hub assembly. The air is delivered to the interior of the hub assembly via a lengthwise passage 278 in shaft 68 into the annular gap 282 between rotor 88 and the stator 78 as shown by the dashed arrows in FIG. 10.

The oil from the interior of rotor 88 also passes through the rotor bearing 94 into the annular gap 282 and mixes with the air injected into that space as described above. Resultantly, the oil and air mix to reduce the viscosity of the lubricant flowing through gap 282 which is quite narrow. Therefore the lubricant exerts minimal drag on the rotating component of the hub assembly motor 62, which in this case is the stator 78. That oil/air mixture is circulated through the rotor bearing 104 and through the gear reducer 64 so as to supplement the oil delivered directly to the gear reducer via the pinion passage 276. After passing through the gear reducer 64, the oil/air mixture circulates along the annular space 284 between the stator case 74 and the hub 204. From there, the oil/air mixture is conducted via a radial passage 286 in the left end of stator case 74 to the inner end of a lengthwise passage 288 in shaft 68 whence it is conducted by coupling 264 back to loop 266.

The hub assembly 262 depicted in FIG. 10 also differs from the other embodiments described above in that the retaining disk 124 at the right hand end of the gear reducer 64 does not have a shaft as is the case with the FIG. 9 embodiment of the invention. Rather, it is provided with a collar 124a for accepting the shaft bearing 132. In this case, the stub shaft 186 is mounted to an end plate 218 which is screwed into the right hand end of hub 204. Alternatively, the end plate may be bolted to the hub. Thus the oil/air mixture circulates past the interior surface of end cap 218 and past ring gear 222 on its way to the annular space 284 between the stator case 74 and hub 204.

Still referring to FIG. 10, the lubricant loop 266 includes a reservoir 292 containing oil which is pumped by a pump 294 through a filter 296 to an air-cooled radiator 298 which may be the radiator of the vehicle equipped with the hub assembly 262. That oil is delivered via coupling 264 to the passage 274 in shaft 68. Loop 266 also includes an air pump 302 which may be driven by the same motor 304 that drives pump 294. The air from pump 302 is delivered to the passage 278 in shaft 68.

The oil/air mixture returning from the hub assembly is conducted by coupling 264 back to reservoir 292 where the air is removed from the oil via a reservoir vent 292a. Thus, the loop 266 recirculates oil and air through the hub assembly 262 so as to cool the assembly and lubricate its moving parts. Resultantly, the hub assembly can operate at peak power for a long period of time.

Figure 11A:
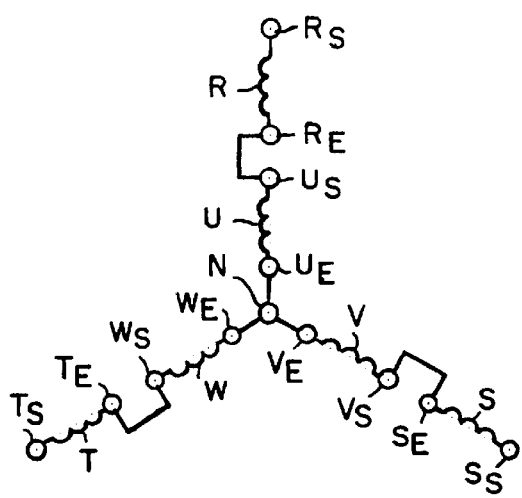
FIGS. 11A and 11B are diagrammatic views of the stator winding connections of the FIG. 10 assembly at low and high speeds.
Figure 11B:
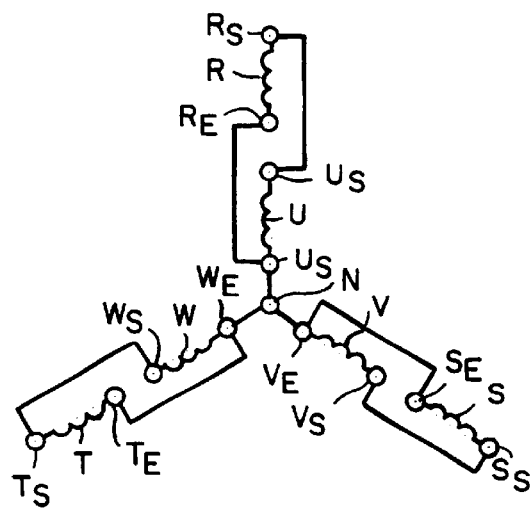

The stator 78 of motor 62 in the hub assembly 262 shown in FIG. 10 may actually have six stator windings as shown in FIGS. 11A and 11B. These windings are labeled R, S, T, U, V, W in those figures. Thus, ten power leads extend out of shaft 68 to controller/power supply 272 as follows: $R_S$, $R_E$, $S_S$, $S_E$, $T_S$, $T_E$, $U_S$, $V_S$, $W_S$ and N. Furthermore, provision may be made for connecting these windings in series as shown in FIG. 11A or in parallel as shown in FIG. 11B. The former connection gives the hub assembly a low speed/high torque capability; the latter connection produces high speed/low torque operation. The windings may be switched between the series and parallel connections by means of a six pole, double throw solenoid switch 302 shown in FIG. 12 which switch may be incorporated into the controller/power supply 272. Alternatively, a conventional electronic switch may be used for this purpose. In either case, when the hub 204 is rotating below a selected speed, say 400–500 RPM, the windings are connected in series as shown in FIG. 11A. Above the selected speed, the windings are connected in parallel as seen in FIG. 11B. FIG. 13 is a graph showing the torque and efficiency of hub assembly 262 over its operating range. The horizontal axis of the FIG. 13 graph shows hub RPM and miles per hour for a 27 inch wheel. The left hand vertical axis shows wheel torque and the right hand vertical axis indicates motor efficiency percentage. As seen from FIG. 13, at low speeds, the hub assembly produces a relatively high output torque as shown by the wavesform $T_1$ in FIG. 13. Above 400–500 RPM, the switch 302 switches the connections between the windings for parallel operation as shown in FIG. 11B. At these higher speeds, hub assembly 262 produces a relatively low output torque as indicated by the waveform $T_2$ in FIG. 13.

Curve E in FIG. 13 shows the composite percent efficiency of the ten wire hub assembly. As shown by that waveform, the hub assembly is at least 95% efficient over substantially the entire operating range of the assembly, i.e., from about 200 RPM to 900 RPM, which corresponds to about 15 MPH to 70 MPH for a vehicle with a 27 inch wheel.

Figure 12:
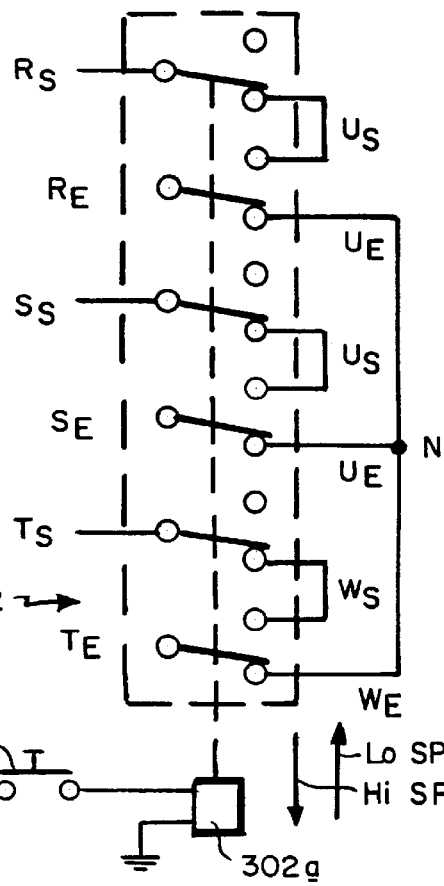
FIG. 12 is a similar view of the switch mechanism for switching between the windings in FIGS. 11A and 11B.
Figure 13:
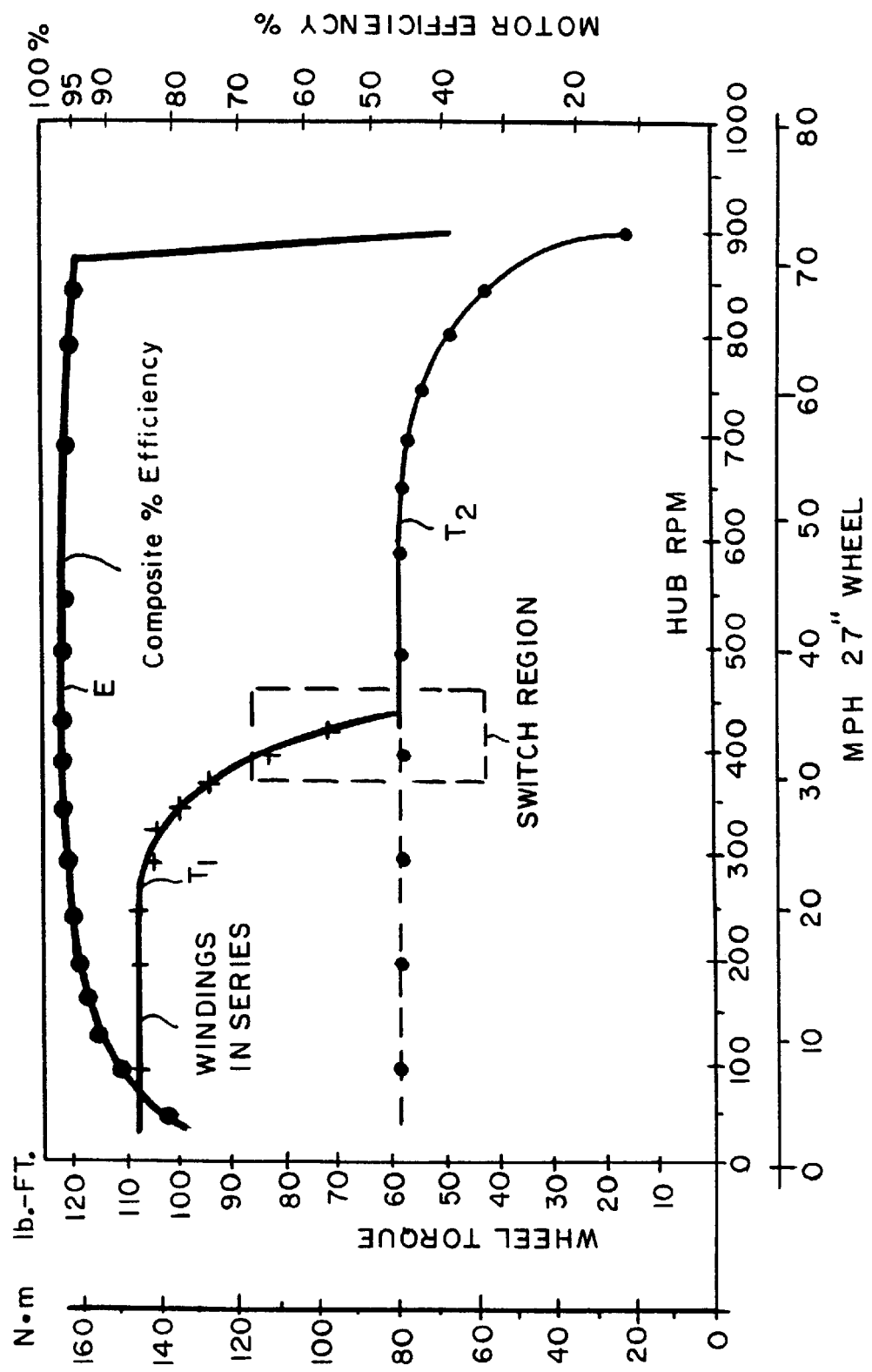
FIG. 13 is a graphical diagram showing the torque and efficiency of the FIG. 10 hub.

In FIG. 12, the switch 302 is shown biased to its high speed position. It may be switched to its low speed position by energizing the switch solenoid 302a. For example, when climbing a hill, the rider of the vehicle being propelled by the hub assembly may close a switch 204 manually to connect solenoid 302a to a voltage source, e.g. battery 52 in FIG. 1, to obtain high torque operation. Alternatively, switch 302 may be actuated automatically by a sensor (not shown) which monitors wheel or pedal sprocket speed.

Thus the hub assembly described above incorporates what is essentially an electronic torque converter in lieu of a mechanical torque converter, with its ancillary bulk and cost, in order to operate at very high efficiency over its entire operating range. In other words, prior hub motors, typified by the ones described in U.S. Pat. No. 5,101,924 and 5,552,988, are not highly efficient over the full operating range. Therefore, they require an expensive mechanical torque converter in order to operate a basically inefficient motor near the maximum of its highly peaked efficient curve. The present assembly, being highly efficient over its full operating range as shown by curve E in FIG. 13, does not require those extra mechanical parts.

In the embodiment just described, ten power leads are brought out of shaft 68 in FIG. 10. It is also possible to also bring out the $U_E$, $V_E$, and $W_E$ leads (instead of connecting them internally as the N lead). Then, using more poles on switch 302, the stator windings may be switched between the well-known DELTA and WYE motor connections to achieve even greater variations in motor speed and torque.

The cantilevered hub assemblies in FIGS. 7, 9 and 10 are shown as rotating a wheel. However, the same assemblies can be used to rotate other things such as rotor blades, fan blades, propeller blades, etc. For example, in lieu of wheel 208 propeller blades may be mounted to the outside wall of hub 204 as shown in dotted lines at P in FIG. 10 so that the hub assembly could be used to propel a boat. Obviously in that event, the hub 204 would be given an aerodynamic or hydrodynamic shape to minimize drag.

It will be seen from the foregoing that my modular motorized wheel hub assembly obtains distinct advantages in terms of the ability to produce a high output torque in a small compact package without the assembly overheating even after a long period of continuous use. The modular assembly is adaptable to a wide variety of wheeled vehicles from small bicycles and tricycles to large on and off road cars and trucks. The assembly is operable as a motor or a generator so that it can function as a drive motor or brake. Despite all of these advantages, the assembly is still relatively inexpensive to make and easy to assemble and repair. Therefore, it should not add appreciably to the overall cost of the vehicle in which it is installed.

In fact, my hub assemblies for larger vehicles (FIGS. 7–10) have far fewer parts than competing internal combustion engine-driven vehicles because drive shafts, couplings, clutches, differentials, front or rear axles, starters, torque converters as well as anti-lock brake and pollution control systems are unnecessary. Overall, with my modular electric hub system, the life of the entire vehicle can be reasonably extended, as the entire motor, drive train and wheel system can be removed and replaced in minutes by undoing not much more than a single bolt; see e.g., FIG. 9, bolt 184.

It will thus be seen that the objects set forth above, among those made apparent from the preceding description are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention described herein.

What is claimed is:

1. A motorized hub assembly comprising
    a motor section having first and second end walls and a side wall extending between the end walls, stator windings fixed to and in intimate thermal contact with said side and end walls, a rotor rotatably mounted within the stator windings, a first shaft extending from the first end wall and a second shaft connected to said rotor and having an end extending through the second end wall, said second shaft being coaxial to but spaced axially from the first shaft, and
    a gear reduction section adjacent to the second end wall, said gear reduction section including a pinion at the end of the second shaft, a plurality of nonorbiting planet gears rotatably mounted to the second end wall in meshing engagement with the pinion, a third shaft coaxial to, but spaced axially from, the first and second shafts, a hub having an interior surface closely surrounding the motor section side and first end walls and said planet gears and being rotatably coupled to the first shaft and second end wall, and a ring gear formed at the interior surface of the hub in meshing engagement with the planet gears so that when said windings are energized, the heat produced thereby is conducted by said side and first end walls to said hub and thence to the outside while the hub rotates relative to the first shaft at a speed less than that of the second shaft.

2. The assembly defined in claim 1 and further including means for introducing a thermally conductive liquid into the hub so that when the hub rotates, the liquid is circulated between the motor section and the hub whereby the heat generated within the motor section by the stator windings is conducted by the liquid directly to the hub.

3. The assembly defined in claim 1 wherein the first and third shafts project from the hub.

4. The assembly defined in claim 1 wherein only the first shaft projects from the hub.

5. Assembly defined in claim 1 wherein
    the hub has first and second end walls and a side wall extending between said end walls, and
    one of said end walls covers the third shaft.

6. The assembly defined in claim 5 wherein
    the hub second end wall has a cylindrical skirt which forms an extension of the hub side wall, and
    said ring gear is formed in said skirt.

7. The assembly defined in claim 5 wherein
    the hub second end wall is a separate part from the hub side wall, and
    means for releasably securing the hub second end wall to the hub side wall.

8. The assembly defined in claim 7 wherein each planet gear has a relatively large diameter first section in meshing engagement with the pinion and a smaller diameter second section collinear to the first section and in meshing engagement with the ring gear so that the assembly has two-stage gear reduction.

9. The assembly defined in claim 1 wherein said ring gear is formed in the hub side wall.

10. The assembly defined in claim 1 wherein each planet gear has a relatively large diameter first section in meshing engagement with the pinion and a smaller diameter second section collinear to the first section and in meshing engagement with the ring gear so that the assembly has two-stage gear reduction.

11. The assembly defined in claim 1 and further including a wheel fixed to rotate with said hub.

12. The assembly defined in claim 1 and further including blades fixed to rotate with said hub.

13. The assembly defined in claim 1 wherein said motor section is sealed.

14. A motorized hub assembly comprising
    a sealed motor section having stationary first and second end walls and a stationary side wall extending between the end walls, stator windings fixed to and in intimate thermal contact with said side and end walls,
    a rotor rotatably mounted within the stator windings, a first shaft extending from the first end wall and a second shaft connected to said rotor and having an end extending through the second end wall, said second shaft being coaxial to but spaced axially from the first shaft, and a gear reduction section adjacent to the second end wall, said gear reduction section including a pinion at the end of the second shaft, a gear support connected to the second end wall, a plurality of nonorbiting planet gears rotatably mounted between the second end wall and the gear support in meshing engagement with the pinion, a hub having an interior surface closely surrounding the motor section side and first end walls and the planet gears, means including a third shaft for rotatably coupling the hub to the first shaft and the gear support, and a ring gear formed at the interior of the hub in meshing engagement with the planet gears so that when said windings are energized, the heat produced thereby is conducted by said side and first end walls to said hub and thence to the outside while the hub rotates relative to the first shaft a at speed less than that of the second shaft.

15. The assembly defined in claim 14 where only the first shaft projects from the hub.

16. The assembly defined in claim 14 wherein
the hub has first and second end walls and a side wall extending between said end walls, and
said third shaft extends from the gear support and is rotatably supported by the hub second end wall.

17. The assembly defined in claim 14 wherein
the hub has first and second end walls and a side wall extending between said end walls, and
said third shaft extends from the hub second end wall and is rotatably supported by the gear support.

18. The assembly defined in claim 14 wherein
the hub has first and second end walls and a side wall extending between said end walls, and
said third shaft extends from said gear support through said hub second end wall.

19. The assembly defined in claim 14 and further including circulating means for introducing a thermally conductive fluid into the hub so that when the hub rotates, the fluid is circulated between the motor section and the hub whereby the heat generated within the motor section by said windings is conducted by the fluid directly to the hub.

20. The assembly defined in claim 19 wherein said fluid includes a lubricant and air.

21. The hub assembly defined in claim 19 wherein the circulating means include
a source of lubricant;
first pump means for pumping the lubricant from the source to the interior of said hub
conduit means for conducting the lubricant from the interior of the hub back to the source, and
a radiator for cooling the lubricant circulated to the interior of the hub.

22. The assembly defined in claim 21, and further including a filter for filtering the lubricant circulated to the interior of the hub.

23. The assembly defined in claim 21 wherein the circulating means also include means for conducting air to and from the interior of the hub.

24. The assembly defined in claim 20 wherein
the motor section includes a hollow rotor, and
the circulating means circulates the lubricant through the rotor to the gear reduction section and circulates the air through said gap.

25. The assembly defined in claim 19 wherein said rotor has a plurality of magnetic poles, and further including a plurality of Hall sensors positioned opposite the rotor for sensing the passage of said poles when the rotor is rotating.

26. The assembly defined in claim 14 and further including a controllable power source for supplying power to the stator.

27. The assembly defined in claim 26 wherein the power source includes switch means for selectively connecting said windings in series or in parallel so that the motor section can produce a first torque at lower rotor speeds and a second torque at higher rotor speeds, the second torque being lower than the first torque.

28. A motorized wheel hub comprising
a motor section having first and second end walls and a side wall extending between the end walls, stator windings fixed to and in intimate thermal contact with said side and end walls, a rotor rotatably mounted within the stator windings, a first shaft extending from the first end wall, and a second shaft connected to said rotor and having an end extending through the second end wall, said second shaft being coaxial to but spaced axially from the first shaft, and
a gear reduction section adjacent to the second end wall, said gear reduction section including a pinion at the end of the second shaft, a gear support connected to the second end wall, a plurality of planet gears rotatably mounted between the second end wall and the gear support in meshing engagement with said pinion, a hub having an interior surface closely surrounding the motor section and said planet gears and being rotatably coupled to the first shaft and a ring gear formed at the interior of the hub in meshing engagement with the planet gears so that when said windings are energized, the heat produced thereby is conducted by said side and first end walls to said hub and thence to the outside while the hub rotates relative to the first shaft at a speed less than that of the second shaft.

29. The assembly defined in claim 28 wherein only the first shaft projects from the hub.

30. The hub assembly defined in claim 29 and further including means for securing only the first shaft to a support.

31. The assembly defined in claim 28 and further including circulating means for introducing a thermally conductive fluid into the hub so that when the hub rotates, the fluid is circulated between the motor section and the hub so that heat generated within the motor section by said stator windings is conducted by the fluid directly to the hub.

32. The hub assembly defined in claim 31 wherein the circulating means include a passage in the first shaft for conducting said fluid to and from the hub.

33. The assembly defined in claim 28 wherein the hub has first and second end walls and a side wall extending between said end walls, and
said gear support is rotatably supported by the hub second end wall.

34. The assembly defined in the claim 33 wherein the hub second end wall covers said gear support.

35. The assembly defined in claim 28 wherein the motor section includes a controllable power source for supplying power to the stator windings.

36. The assembly defined in claim 35 wherein the power source includes switch means for selectively connecting said stator windings in series or in parallel so that the motor section can produce a first torque at lower rotor speeds and a second torque at higher rotor speeds said second torque being lower than the first torque.

37. The hub assembly defined in claim 35 wherein the power source is connected to the stator windings by wires extending through said first shaft.

* * * * *